United States Patent
Wen et al.

(10) Patent No.: US 12,386,819 B2
(45) Date of Patent: Aug. 12, 2025

(54) METHOD AND SYSTEM FOR TRANSACTION MANAGEMENT, NETWORK DEVICE, AND READABLE STORAGE MEDIUM

(71) Applicant: ZTE CORPORATION, Guangdong (CN)

(72) Inventors: Tao Wen, Guangdong (CN); Da Lv, Guangdong (CN); Han Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/767,432

(22) PCT Filed: Sep. 30, 2020

(86) PCT No.: PCT/CN2020/119646
§ 371 (c)(1),
(2) Date: Apr. 7, 2022

(87) PCT Pub. No.: WO2021/068850
PCT Pub. Date: Apr. 15, 2021

(65) Prior Publication Data
US 2024/0095236 A1    Mar. 21, 2024

(30) Foreign Application Priority Data
Oct. 11, 2019   (CN) .......................... 201910965337.9

(51) Int. Cl.
*G06F 16/242* (2019.01)
(52) U.S. Cl.
CPC ................................ *G06F 16/2425* (2019.01)
(58) Field of Classification Search
CPC .................................................. G06F 16/2425
See application file for complete search history.

(56) References Cited

U.S. PATENT DOCUMENTS 10,409,811 B1 * 9/2019 Kesler ............... G06F 16/24564
2009/0150566 A1   6/2009 Malkhi et al.
(Continued)

FOREIGN PATENT DOCUMENTS

| CN | 105183544 A | 12/2015 |
| CN | 106445644 A | 2/2017 |

(Continued)

OTHER PUBLICATIONS

ZTE Corporation, International Search Report with English translation, PCT/CN2020/119646, Dec. 30, 2020, 7 pgs.
(Continued)

*Primary Examiner* — Khanh B Pham
*Assistant Examiner* — Ranjit P Doraiswamy
(74) *Attorney, Agent, or Firm* — Li & Cai Intellectual Property (USA) Office

(57) ABSTRACT

Disclosed are a method and system for transaction management, a network device, and a readable storage medium. The method includes the following. A coordinating node receives a structured query language (SQL) request externally initiated, where the SQL request is forwarded by a master node. The coordinating node decomposes the SQL request into sub-SQL (SubSQL) requests, and transmits each of the SubSQL requests to a corresponding slave node. Each slave node receives and processes a corresponding SubSQL request, transmits execution status information of the corresponding SubSQL request to the coordinating node and/or other slave nodes, and receives execution status information in processing respective SubSQL requests by the other slave nodes. Each particular slave node of one or more of the slave nodes feeds back a current local transaction status set of the particular slave node according to status query information received from the master node or the coordinating node.

19 Claims, 2 Drawing Sheets

(56) References Cited

U.S. PATENT DOCUMENTS

2014/0280375 A1 9/2014 Rawson et al.
2018/0349430 A1* 12/2018 Lee .................... G06F 16/2365

FOREIGN PATENT DOCUMENTS

| CN | 106649418 | A | 5/2017 |
| CN | 108710638 | A | 10/2018 |
| CN | 108845866 | A | 11/2018 |
| CN | 109325073 | A | 2/2019 |
| CN | 109977171 | A | 7/2019 |
| JP | 4199339 | B2 | 12/2008 |
| JP | 2012022379 | A | 2/2012 |

OTHER PUBLICATIONS

European Patent Office, EP20873872.4 Extended European Search Report issued on Sep. 27, 2022.
Gligor V D., et al., "Distributed Database Management Systems: An Architectural Perspective", Journal of Telecommunications, Networks, Computer Science Press Inc. Maryland, vol. 2, No. 3, Jan. 1, 1983.
Japan Patent Office, JP2022-519425 First Office Action issued on Apr. 18, 2023.

* cited by examiner

METHOD AND SYSTEM FOR TRANSACTION MANAGEMENT, NETWORK DEVICE, AND READABLE STORAGE MEDIUM

CROSS REFERENCE TO RELATED APPLICATIONS

The present application is a United States National Stage Application filed under 35 U.S.C. § 371 of PCT Patent Application Serial No. PCT/CN2020/119646, filed Sep. 30, 2020, which claims priority to Chinese patent application No. 201910965337.9 filed on Oct. 11, 2019, each of which is incorporated by reference herein in its entirety.

TECHNICAL FIELD

The embodiments of the present disclosure relate to but not limited to the field of computer technology, and in particular to but not limited to a method and system for transaction management, a network device, and a readable storage medium.

BACKGROUND

Distributed transaction submission is a core function of a distributed database. An implementation manner of the distributed transaction submission directly decides transaction control of a system.

A current mainstream distributed database is characterized by horizontal partitioning (sharding). That is, a data table presents a horizontal expansion form (according to row keys) and is distributed at different physical nodes. A structured query language (SQL) query request initiated by a user accesses a master node (Master) through a distributed database and is then routed to each participant (Slave, also called a participating node or a slave node). After the SQL query request is executed on each slave node, interaction is performed between each slave node and a transaction coordinator (Coordinator, also called a coordinating node) according to a two-phase commit (2PC) protocol to commit or roll back a transaction.

Particularly, in the 2PC protocol, a first phase is called a voting phase. In the first phase, the transaction coordinator transmits a voting request to each of physical nodes. Thereafter, each slave node write execution status ("prepare" or "abort") of the transaction at this node into a log, and transmits the execution status to the transaction coordinator. A second phase is called a deciding phase. In the second phase, the transaction coordinator makes a decision according to the execution status of each of the slave nodes in the first phase. If all the slave nodes are under the "prepare" status, a "commit" instruction is transmitted to all the slave nodes. However, if some slave nodes are under "abort" status, a "rollback" instruction is transmitted to all the slave nodes. After receiving the instruction from the transaction coordinator, each slave node performs a "commit" or "rollback" operation, writes the "commit" or "rollback" status into the log, and replies to the transaction coordinator. Finally, the transaction coordinator feeds back an execution result (if "committed", return a message indicating the transaction is successful; or if "rollbacked", return a message indicating transaction failure) of the transaction to the master node (Master).

SUMMARY

In some embodiments, a method for transaction management is provided. The method includes the following. A coordinating node receives a structured query language (SQL) request externally initiated, where the SQL request is forwarded by a master node. The coordinating node decomposes the SQL request into sub-SQL (SubSQL) requests, and transmits each of the SubSQL requests to a corresponding slave node of slave nodes. A respective slave node of the slave nodes receives and processes a corresponding SubSQL request, transmits execution status information of the corresponding SubSQL request to the coordinating node and/or other slave nodes, and receives execution status information in processing respective SubSQL requests by the other slave nodes. Each particular slave node of at least one slave node of the slave nodes feeds back a current local transaction status set of the particular slave node according to status query information received from the master node or the coordinating node.

In some embodiments, a system for transaction management is provided. The system includes a master node, a coordinating node, and slave nodes. The coordinating node is configured to receive a structured query language (SQL) request externally initiated, where the SQL request is forwarded by the master node. The coordinating node is further configured to decompose the SQL request into sub-SQL (SubSQL) requests, and transmit each of the SubSQL requests to a corresponding slave node of the slave nodes. Each slave node of the slave nodes is configured to receive and process a corresponding SubSQL request, transmit execution status information of the corresponding SubSQL request to the coordinating node and/or other slave nodes, and receive execution status information in processing respective SubSQL requests by the other slave nodes. Each particular slave node of at least one slave node of the slave nodes is configured to feed back a current local transaction status set of the particular slave node according to status query information received from the master node or the coordinating node.

In some embodiments, a network device is provided. The network device includes a processor, a memory, and a communication bus. The communication bus is configured to implement communication connection between the processor and the memory. The processor is configured to execute one or more computer programs stored in the memory to perform operations of the method described above.

In some embodiments, a computer-readable storage medium is provided. The computer-readable storage medium stores one or more computer programs executable by one or more processors to perform operations of the method described above.

DETAILED DESCRIPTION

In order to make the purpose, the technical solution, and the advantages of the present disclosure clearer, some embodiments of the present disclosure will be explained below in detail with reference to the accompanying drawings and implementations. It should be understood that the embodiments described here are merely used for explaining the present disclosure rather than limiting the present disclosure.

In some conditions, a disadvantage of a two-phase commit (2PC) protocol is described as follows. In a first phase, after a slave node transmits status of the slave node to a transaction coordinator, even if the slave node is in "prepare" status, the slave node also needs to keep waiting for a decision command by the transaction coordinator, that is, there is no timeout logic. A reason is that in the 2PC protocol, there is no mutual communication mechanism between slave nodes, and whether to "submit" or "rollback" is decided by the transaction coordinator. If there is fault to the transaction coordinator, the slave nodes have to persistently wait for the transaction coordinator to be recovered and to give a clear instruction. In this process, locked resources held by the slave nodes for the transaction may not be released. The above process is referred to as "blocking". Therefore, under the 2PC protocol, a fault in the transaction coordinator would cause blocking and thus a transaction processing capability of a system may be reduced.

Some embodiments of the present disclosure provide a method and system for transaction management, a network device, and a readable storage medium, which aims to avoid blocking in log management and improve efficiency of transaction processing.

Embodiment 1

Figure 1:
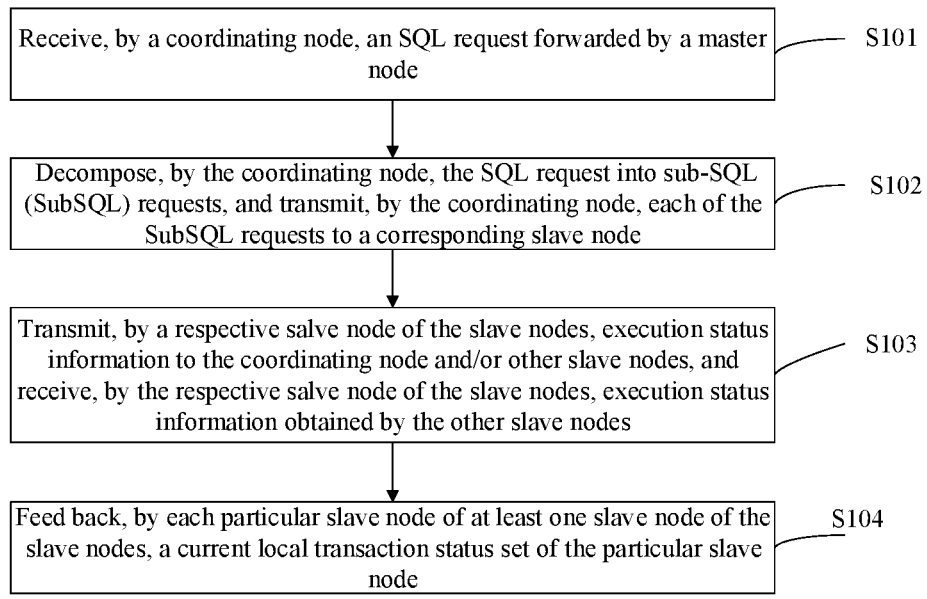
FIG. 1 is a flow chart of a method for transaction management provided in Embodiment 1 of the present disclosure.

This embodiment provides a method for transaction management. With reference to FIG. 1, the method includes following operations.

In S101, a coordinating node (i.e., coordinator) receives a structured query language (SQL) request externally initiated, where the SQL request is forwarded by a master node (Master).

In S102, the coordinating node decomposes the SQL request into sub-SQL (SubSQL) requests, and transmits each of the SubSQL requests to a corresponding slave node of slave nodes (Slave).

In S103, each slave node of the slave nodes receives and processes a corresponding SubSQL request, transmits execution status information of the SubSQL request to the coordinating node and/or other slave nodes, and receives execution status information in processing respective SubSQL requests by the other slave nodes.

In S104, each particular slave node of at least one slave node of the slave nodes feeds back a current local transaction status set of the particular slave node according to status query information received from the master node or the coordinating node.

The master node achieves an interaction between the system and an external environment (i.e., a user). An SQL request initiated by the user is received through the master node, and then a process for transaction management in embodiments may be started. Hereafter, the master node may optionally transmit the query request to the coordinating node or the slave nodes, and wait for a response message from the coordinating node or the slave nodes.

The master node transmits the SQL request to the coordinating node, and thus the coordinating node plays a role of relay between the master node and each of the slave nodes. The coordinating node may decompose the SQL request to obtain SubSQL requests, and then transmit each of the SubSQL requests to a corresponding slave node for processing. In addition, the coordinating node may receive related execution status information transmitted by the slave nodes. That is, the coordinating node can not only record status of the slave nodes, but also can respond to the query request initiated by the master node.

Each slave node receives and processes the SubSQL request transmitted by the coordinating node, transmits execution status information of the SubSQL request to the coordinating node and/or other slave nodes, and may synchronously receive execution status information transmitted by the other slave nodes. In this way, the slave nodes may obtain information and then make decisions by themselves, which may improve flexibility of the system and reduces a blocking rate of the system.

In embodiments, message primitives between the master node, the coordinating node, and the slave nodes, include but are not limited to the following.

A "global transaction startup" message is transmitted by the master node (Master) to the transaction coordinator (Coordinator), and includes an SQL request and a transaction sequence number TX.

A "global transaction completion" message is transmitted by the slave node (Slave) to the mater node (Master), and includes TX and a global flag (GlobalFlag, where "Success" indicates global success, and "Fail" indicates global failure).

A "local transaction startup" message is transmitted to the slave node (Slave) by the transaction coordinator (Coordinator) through TXmsgMgr, and includes TX, a SubSQL request which is obtained by decomposing a global transaction SQL request by the Coordinator, information of multiple Slaves that feed back a global result to the Master in a current transaction, parameter P1 of the TXLogMgr, parameter P2 of the TXmsgMgr, and timeout time.

A "local transaction status notification" message is transmitted by the slave node (Slave) to other slave nodes (Slaves) and/or Coordinator through TXmsgMgr, and includes TX, identification (ID) of the Slave, and status ("prepare" indicating local readiness, and "abort" indicating local abortion) of the Slave. StatusSet denotes a data set of transaction TX. In the StatusSet, each element denotes status ("prepare" or "abort") of a corresponding participant (Slave) for the TX.

A "global transaction status query" message is transmitted by Slave/Master to Coordinator/Slave and includes TX.

A "global transaction status response" message is transmitted by Coordinator/Slave to Slave/Master, and includes TX and StatusSet (local transaction status sets locally stored on respective nodes for global transaction TX up till now).

A "timeout notification" message is transmitted by a timeout timer set by Slave to Slave per se, including TX.

A "warning notification" message is transmitted by a warning timer set by Master/Slave to Master/Slave per se, including TX.

Each slave node may perform following actions during a transaction process.

A local transaction execution operation (OpExecute): a "TXBegin" record is written in a local storage device through a TXLogMgr component, an SQL request operation is executed to obtain a local locked resource, and during this process, and data change information is written into the local storage device through the TXLogMgr component.

A local transaction commit operation (OpCommit): the local locked resource is released, and a "commit" record is written into the local storage device through the TXLogMgr component. Additionally, if the Slave is specified to make a response to the Master, the Slave transmits a "global transaction completion" message to the Master, where "Global-Flag" is set to "Success" indicating global success.

A local transaction rollback operation (OpRollback): local storage device information is read, data covering is performed by using transaction data change information, the local locked resource is released, and a "rollback" record is written into the local storage device through the TXLogMgr component. Additionally, if the Slave is specified to return a reply to Master, the Slave transmits a "global transaction completion" message to the Master, where "GlobalFlag" is set to be "Fail" indicating global failure.

In some implementations, in receiving, with the coordinating node, the externally initiated SQL request forwarded by the master node, the method further includes the following.

A warning timer is started by the master node after forwarding the SQL request to the coordinating node.

In some implementations, the coordinating node decomposes the SQL request into the SubSQL requests and transmits each of the SubSQL requests to the corresponding slave node as follows.

The coordinating node decomposes the SQL request into the SubSQL requests for the slave nodes, and determines a group of network parameters for a respective slave node of the slave nodes. The group of network parameters includes at least one of a log TXLogMgr parameter, a message TXmsgMgr parameter, and timeout time information. An appropriate network parameter may improve transaction processing efficiency of the system.

TXLogMgr exists in a program between the coordinating node and the slave node, and is used for performing a log reading/writing operation of the program. A target medium into which the TXLogMgr component writes logs may be a magnetic disc or a non-volatile storage device such as a NOT AND (NAND) flash memory or a phase change memory (PCM). The TXLogMgr performs local buffering upon receiving a writing request. A buffering time is "writing interval parameter" P1. No writing is performed to the target medium until expiration of the buffering time. That is, the TXLogMgr parameter refers to "writing interval parameter" P1.

TXmsgMgr exists in a program between the coordinating node and the slave node, and is used for processing network communication of the program. The TXLogMgr component may perform communication through a conventional communication device or a communication device supported by a remote direct memory access (RDMA) protocol, for example, a communication device supported by the RDMA protocol. A multicast protocol or a unicast protocol is adopted for communication of the TXmsgMgr component. TXmsgMgr performs local buffering upon receiving a transmission request. A buffering time is "transmission interval parameter" P2. No transmission is performed until the expiration of the buffering time. That is, the TXmsgMgr parameter refers to the "transmission interval parameter" P2.

In some implementations, the group of network parameters may further include information of a specific slave node (s), where the specific slave node is specified by the coordinating node from the slave nodes to reply to the master node. That is, the specific slave node(s) may directly respond to a query request initiated by the master node. Therefore, before this, the coordinating node may specify the specific slave node(s) from the slave nodes to reply to the master node.

In some implementations, the coordinating node transmits a respective set of network parameters to a corresponding slave node through TXmsgMgr.

In some implementations, the slave node receives and processes the corresponding SubSQL request as follows.

The slave node performs a local transaction execution operation until prepare status or abort status is reached.

In some implementations, during performing of the local transaction execution operation by the slave node, in response to the abort status being reached, the method further includes the following.

The slave node performs a rollback action.

In some implementations, during performing of the local transaction execution operation by the slave node, in response to the prepare status being reached, the method further includes the following.

The slave node transmits execution status information corresponding to the prepare status to the coordinating node and/or the other slave nodes, and writes the prepare status into a local storage.

In some implementations, after receiving the execution status information in processing the respective SubSQL requests by the other slave nodes, the method further includes the following.

The slave node combines local execution status information with the received execution status information in processing the respective SubSQL requests by the other slave nodes, adds the local execution status information and the received execution status information that are combined to the local transaction status set, and writes the local transaction status set into the local storage.

In some implementations, the method further includes the following.

The At least one slave node transmits a global transaction status query message to the master node and/or the coordinating node to initiatively query a latest state of a transaction TX.

In some implementations, before the coordinating node receives the SQL request externally initiated, the method further includes the following.

The system is initiated.

The master node, the coordinating node, and the slave nodes are added to a multicast group.

Statistics is performed on transaction startup and completion in the system within a preset time period.

A value of the log TXLogMgr parameter and a value of the message TXmsgMgr parameter are set based on the transaction startup and completion in the system.

For a recovery process of a distributed transaction, actions of all participants (Slaves) need to meet consistency of the transaction.

Slave logs written through the TXLogMgr are traversed, and for each transaction, following operations may be performed.

If there are "TXBegin", "Prepare", and "Commit" records, no action is required.

If there are "TXBegin", "Prepare", and "Rollback" records, no action is required.

If there are "TXBegin" and "Rollback" records, no action is required.

If there is only a "TXBegin" record, a local transaction rollback operation (OpRollback) is executed.

If there are only a "TXBegin" and "Prepare" records, a "global transaction status query" message is transmitted through the TXmsgMgr to the coordinator and other participants (Slaves) until status of all the participants are obtained. In response to all the participants being in the "prepare" status in the transaction TX, the local transaction commit operation (OpCommit) is executed. Otherwise, the local transaction rollback operation (OpRollback) is executed.

Embodiments provides a method for transaction management. In the method, the coordinating node receives the externally initiated SQL request forwarded by the master node. The coordinating node decomposes the SQL request into the SubSQL requests, and transmits each of the SubSQL requests to the corresponding slave node. Each slave node receives and processes the corresponding SubSQL request, transmits the execution status information of the SubSQL request to the coordinating node and/or other slave nodes, and receives the execution status information in processing the respective SubSQL requests by the other slave nodes. Each particular slave node of at least one slave node of the slave nodes feeds back a current local transaction status set of the particular slave node according to status query information received from the master node or the coordinating node. In this way, the slave nodes are able to respectively perform transmission and reception of execution status information and feedback to the status query information, which may improve flexibility of the system and reduces blocking rate of the system, such that the transaction processing efficiency may be improved.

Embodiment 2

Figure 2:
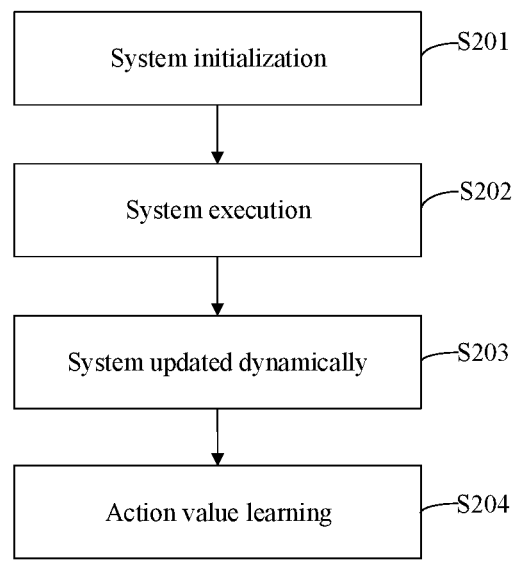
FIG. 2 is a flow chart of a method for transaction management provided in Embodiment 2 of the present disclosure.

Embodiment provides a method and system for transaction management. With reference to FIG. 2, following definition is provided first as follows.

Ps is defined as a discrete space of the amount of writing transactions started in a current cycle of a system, where |P| represents a scale of space Ps.

p is defined as a number of writing transactions started in the current cycle of the system in the Ps interval, where $|P|>p>=0$.

Fs is defined as a discrete space of the amount of writing transactions completed in the current cycle of the system, where |F| represents a scale of space Fs.

f is defined as a number of writing transactions completed in the current cycle of the system in the Fs interval, where $|F|>f>=0$.

Es is defined as a discrete space with an improved TXLogMgr writing log interval rate of the system, |E| representing a scale of Es.

Define e as a number of a related action of the system in the Es interval, where $|E|>e>=0$.

Ds is defined as a discrete space with an improved TXmsgMgr transmitting message interval rate of the system, |D| being a scale of Ds.

Define d as a number of a related action of the system in the Ds interval, where $|D|>d>=0$.

Status space S: one dimensional discretization <Ps, Fs>, and in S, subscript $i=p*|F|\pm f$.

Action space A: one dimensional discretization <Es, Ds>, and in A, subscript $j=e*|D|+d$.

An action value table Q: a two-dimensional array, where Q[i, j] denotes an evaluation score of action Aj under status Si.

Reward R: an acceleration rate of an average time spent on writing transactions in the current cycle of the system.

Learning rate (LearningRate): deciding an update efficiency of an action value table Q.

Utilization rate (eps): deciding a probability that the system uses a current optimal parameter for setting.

The system for transaction management may perform following system actions.

The system is initialized. During initialization, following operations are performed.

The action value table Q is randomly initialized.

Initialization status (Sinit) is determined according to the amount of writing transactions started and completed in the system in the current cycle.

Initialization selection Ainit: an action Ainit where a highest evaluation score is located under status Sinit in the Q table is selected with probability eps according to current status Sinit, and an action Ainit under S0 is randomly selected with probability 1-eps.

Define Ac=Ainit and Sc=Sinit. The action in Ac is executed. A writing interval P1 of the TXLogMgr and a transmission interval P2 of the TXmsgMgr are set.

An action value table is trained regularly and a current action is selected.

An environment reward R for executing Ac in the current cycle is calculated.

Current status (Snext) is determined according to the amount of writing transactions started and completed in the system in the current cycle.

Anext is selected. Based on status Snext, an action Anext where a highest evaluation score is located under status Snext in the Q table is selected with probability eps, and an action Anext under the Snext is randomly selected with probability 1-eps.

Action value learning is as follows.

$$Q[Sc,Ac]=Q[Sc,Ac]+\text{LearningRate}*(R+0.5*Q[\text{Snext},\text{Anext}]-Q[Sc,Ac])$$

Define Ac=Anext and Sc=Snext. Actions in the Ac are executed. The writing interval P1 of the TXLogMgr and the transmission interval P2 of the TXmsgMgr are adjusted.

Status space S is defined as Table 1.

TABLE 1

| | The amount of transactions completed | | |
|---|---|---|---|
| The amount of transactions started | Small [0, 999) | Medium[999, 9999) | Large [9999, 99999+) |
| Small [0, 999) | S0 | S1 | S2 |
| Medium[999, 9999) | S3 | S4 | S5 |
| Large [9999, 99999+) | S6 | S7 | S8 |

An action space A is defined as Table 2:

TABLE 2

| | Parameter P1 | | |
|---|---|---|---|
| Parameter P2 | Reduced by 10% | Unadjusted | Increased by 10% |
| Reduced by 10% | A0 | A1 | A2 |
| Unadjusted | A3 | A4 | A5 |
| Increased by 10% | A6 | A7 | A8 |

The action value table Q is defined. Random normal initialization: Q[i,j] represents a value of the action Aj under status Si. Table 3 is as follows.

TABLE 3

|    | A0     | A1     | A2     | A3     | A4     | A5     | A6     | A7     | A8     |
|----|--------|--------|--------|--------|--------|--------|--------|--------|--------|
| S0 | Q[0, 0] | Q[0, 1] | Q[0, 2] | Q[0, 3] | Q[0, 4] | Q[0, 5] | Q[0, 6] | Q[0, 7] | Q[0, 8] |
| S1 | Q[1, 0] | Q[1, 1] | Q[1, 2] | Q[1, 3] | Q[1, 4] | Q[1, 5] | Q[1, 6] | Q[1, 7] | Q[1, 8] |
| S2 | Q[2, 0] | Q[2, 1] | Q[2, 2] | Q[2, 3] | Q[2, 4] | Q[2, 5] | Q[2, 6] | Q[2, 7] | Q[2, 8] |
| S3 | Q[3, 0] | Q[3, 1] | Q[3, 2] | Q[3, 3] | Q[3, 4] | Q[3, 5] | Q[3, 6] | Q[3, 7] | Q[3, 8] |
| S4 | Q[4, 0] | Q[4, 1] | Q[4, 2] | Q[4, 3] | Q[4, 4] | Q[4, 5] | Q[4, 6] | Q[4, 7] | Q[4, 8] |
| S5 | Q[5, 0] | Q[5, 1] | Q[5, 2] | Q[5, 3] | Q[5, 4] | Q[5, 5] | Q[5, 6] | Q[5, 7] | Q[5, 8] |
| S6 | Q[6, 0] | Q[6, 1] | Q[6, 2] | Q[6, 3] | Q[6, 4] | Q[6, 5] | Q[6, 6] | Q[6, 7] | Q[6, 8] |
| S7 | Q[7, 0] | Q[7, 1] | Q[7, 2] | Q[7, 3] | Q[7, 4] | Q[7, 5] | Q[7, 6] | Q[7, 7] | Q[7, 8] |
| S8 | Q[8, 0] | Q[8, 1] | Q[8, 2] | Q[8, 3] | Q[8, 4] | Q[8, 5] | Q[8, 6] | Q[8, 7] | Q[8, 8] |

The learning rate (LarningRate) is defined as 0.1.
The utilization rate (eps) is defined as 0.7.
The writing interval of the TXLogMgr is set to 150 us.
The transmission interval of the TXmsgMgr is set to 30 us.

In S201, the system is initialized.

Initialization status (Sinit) is determined according to the amount of writing transactions started and completed in the system in the current cycle (for example, 5000 transactions are started and 4000 transactions are completed in the system in 5 minutes, determine that Sinit is S4).

Initialization selection Ainit: an action Ainit where a highest evaluation score is located under the status Sinit in the Q table is selected with probability eps according to current status Sinit, and an action Ainit under S0 is randomly selected with probability 1−eps (for example, in response to a finally selected Ainit being A8, parameter P1/P2 respectively rises by 10%).

Define Ac=Ainit and Sc=Sinit. The action in Ac is executed. A writing interval P1 of TXLogMgr and a transmission interval P2 of TXmsgMgr are set.

Communication connection is established among network elements (Master, Slave, and Coordinator). In embodiments, the network elements adopts the multicast communication mode and joins a same multicast group.

In S202, the system executes the following.

A remote direct memory access (RDMA) device and a multicast communication protocol are applied in a TXmsgMgr component communication bottom layer. A TXLogMgr component storage device is a flash memory device. Transaction committing is performed according to a distributed commit protocol. During the transaction committing, an operation strategy of TXLogMgr is determined according to P1 and an operation strategy of TXmsgMgr is determined according to P2.

An average time spent on transaction committing in a current time period is determined.

The amount (TXStarts) of transactions started in the system in the current time period is determined.

The amount (TXEnds) of transactions completed in the system in the current time period is determined.

In S203, the system is updated dynamically.

Calculate an environment reward R in the current cycle (an acceleration rate of an average time spent on writing transactions in the current cycle of the system relative to a previous time).

Current status Snext is determined according to the amount of transactions started (TXStarts) and the amount of transactions completed (TXEnds) in the system in the current cycle.

Anext is selected. Based on status Snext, an action Anext where a highest evaluation score is located under the status Snext in the Q table is selected with probability eps, and an action Anext under the Snext is randomly selected with probability 1−eps.

In S204, action value learning is as follows.

$$Q[Sc,Ac]=Q[Sc,Ac]+LearningRate*(R+0.5*Q[Snext,Anext]-Q[Sc,Ac])$$

Define Ac=Anext and Sc=Snext. Actions in the Ac are executed. The writing interval P1 of the TXLogMgr and the transmission interval P2 of TXmsgMgr are adjusted.

Embodiment 3

Figure 3:
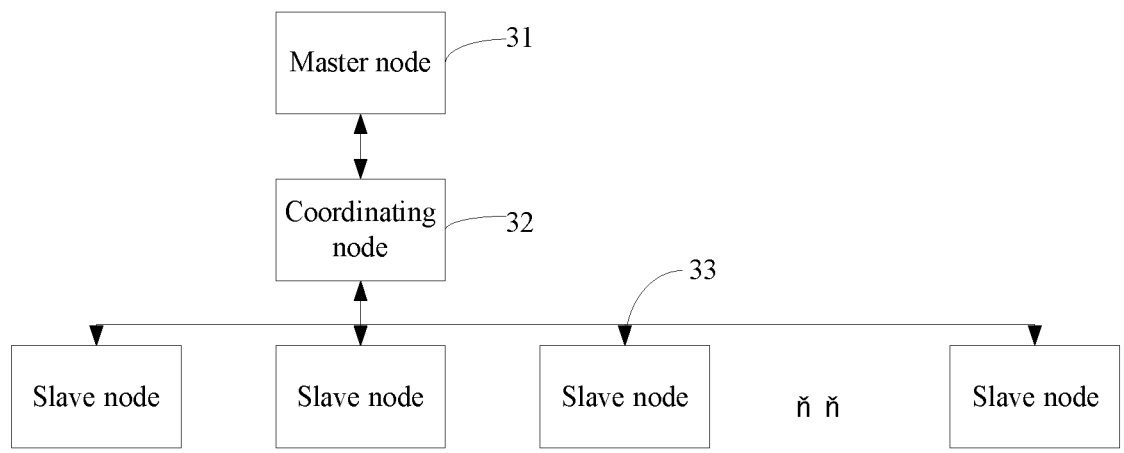
FIG. 3 is a schematic diagram illustrating blocks of a system for transaction management provided in Embodiment 3 of the present disclosure.

This embodiment provides a system for transaction management. With reference to FIG. 3, the system includes a master node 31, a coordinating node 32, and slave nodes 33.

The coordinating node 32 is configured to receive a SQL request externally initiated, where the SQL request is forwarded by the master node 31.

The coordinating node 32 is configured to decompose the SQL request into SubSQL requests, and transmit each of the SubSQL requests to a corresponding slave node 33.

Each slave node 33 is configured to receive and process a corresponding SubSQL request, transmit execution status information of the corresponding SubSQL request to the coordinating node 32 and/or other slave nodes 33, and receive execution status information in processing respective SubSQL requests by the other slave nodes 33.

Each particular slave node of at least one slave node of the slave nodes 33 is configured to feed back a current local transaction status set of the particular slave node 33 according to status query information received from the master node 31 or the coordinating node 32.

The master node 31 achieves an interaction function between the system and an external environment (i.e., a user). An SQL request initiated by the user is received through the master node 31, and then a process for transaction management in embodiments may be started. Hereafter, the master node 31 may optionally transmit the query request to the coordinating node 32 or the slave nodes 33, and wait for a response message from the coordinating node 32 or the slave nodes 33.

The master node 31 transmits the SQL request to the coordinating node 32, and thus the coordinating node 32 plays a role of relay between the master node 31 and each of the slave nodes 33. The coordinating node 32 is configured to decompose the SQL request to obtain SubSQL requests, and then transmit each of the SubSQL requests to a corresponding slave node 33 for processing. In addition, the coordinating node 32 is further configured to receive related execution status information transmitted by the slave nodes 33. That is, the coordinating node can not only record status of the slave nodes 33, but also can respond to the query request initiated by the master node 31.

Each slave node 33 is configured to receive and process the corresponding SubSQL request transmitted by the coordinating node 32, transmit execution status information of the corresponding SubSQL request to the coordinating node 32 and/or other slave nodes 33, and synchronously receive execution status information transmitted by the other slave nodes 33. In this way, the slave nodes 33 may obtain information and then make decisions by themselves, which may improve flexibility of the system and reduce a blocking rate of the system.

In some implementations, in terms of the coordinating node 32 receiving the SQL request externally initiated, the master node 31 is further configured to perform the following after forwarding the SQL request to the coordinating node.

The master node 31 is further configured to start a warning timer.

In some implementations, the coordinating node 32 configured to decompose the SQL request into the SubSQL requests and transmit each of the SubSQL requests to the corresponding slave node 33 is configured to perform the following.

The coordinating node 32 is configured to decompose the SQL request into the SubSQL requests for the slave nodes 33, and determine a group of network parameters for a respective slave node of the slave nodes 33. The group of network parameters include at least one of a log TXLogMgr parameter, a message TXmsgMgr parameter, and timeout time information. An appropriate network parameter may improve transaction processing efficiency of the system.

In some implementations, the group of network parameters may further include information of a specific slave node(s) 33, where the slave node(s) 33 is determined from the slave nodes 33 by the coordinating node 32 to reply to the master node 31. That is, the specific slave node(s) 33 may directly respond to a query request initiated by the master node 31. Therefore, before this, the coordinating node 32 may specify the specific slave node(s) 33 from the slave nodes 33 to reply to the master node 31.

In some implementations, the coordinating node 32 is further configured to transmit a respective set of network parameters to a corresponding slave node 33 through TXmsgMgr.

In some implementations, the slave node 33 configured to receive and process the SubSQL request is configured to perform the following.

The slave node 33 is configured to perform a local transaction execution operation until prepare status or abort status is reached.

In some implementations, during performing of the local transaction execution operation, the slave node 33 is further configured to perform the following in response to the abort status being reached.

The slave node 33 is further configured to perform a rollback action.

In some implementations, during performing of the local transaction execution operation, the slave node 33 is further configured to perform the following in response to the prepare status being reached.

The slave node 33 is further configured to transmit execution status information corresponding to the prepare status to the coordinating node 32 and/or the other slave nodes 33, and write the prepare statue into a local storage.

In some implementations, after receiving the execution status information in processing the respective SubSQL requests by the other slave nodes, the slave node is further configured to perform the following.

The slave node is further configured to combine local execution status information with the received execution status information in processing the respective SubSQL requests by the other slave nodes, add the combined local execution status information and received execution status information to the local transaction status set, and write the local transaction status set into the local storage.

In some implementations, the at least one slave node 33 is further configured to transmit a global transaction status query message to the master node 31 and/or the coordinating node 32 to initiatively query a latest state of a transaction TX.

In some implementations, before the coordinating node 32 receives the SQL request externally initiated, the following may be conducted.

The system is initiated.

The master node 31, the coordinating node 32, and the slave nodes 33 are added to a multicast group.

Statistics is performed on transaction startup and completion in the system within a preset time period.

A value of the log TXLogMgr parameter and a value of the message TXmsgMgr parameter are set based on the transaction startup and the completion in the system.

Embodiments provide a system for transaction management. The coordinating node 32 is configured to receive the SQL request externally initiated, where the SQL request is forwarded by the master node 31. The coordinating node 32 is configured to decompose the SQL request into SubSQL requests, and transmit each of the SubSQL requests to the corresponding slave node 33. Each slave node 33 is configured to receive and process the corresponding SubSQL request, transmit execution status information of the corresponding SubSQL request to the coordinating node 32 and/or other slave nodes 33, and receive execution status information in processing respective SubSQL requests by the other slave nodes. Each particular slave node of at least one slave node of the slave nodes 33 is further configured to feed back the current local transaction status set of the particular slave node 33 according to the status query information received from the master node 31 or the coordinating node 32. In this way, the slave nodes 33 are able to respectively perform transmission and reception of execution status information and feedback to the status query information, which may improve flexibility of the system and reduce a blocking rate of the system, such that the transaction processing efficiency may be improved.

Embodiment 4

Figure 4:
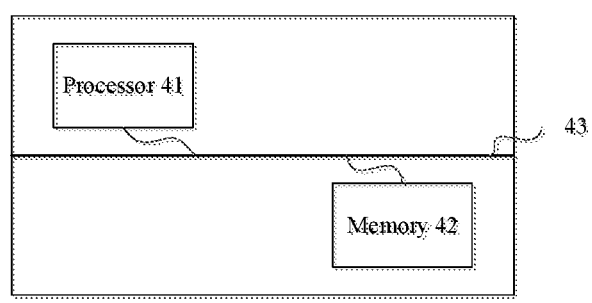
FIG. 4 is a schematic structural diagram illustrating a network device provided in Embodiment 4 of the present disclosure.

Embodiments provide a network device. With reference to FIG. 4, the network device includes a processor 41, a memory 42, and a communication bus 43.

The communication bus 43 is configured to implement communication connection between the processor 41 and the memory 42.

The processor 41 is configured to execute one or more computer programs stored in the memory 42 to implement operations of the method according to the foregoing embodiments, which are not repeated herein.

Embodiments of the present disclosure further provide a computer-readable storage medium that includes volatile or non-volatile, removable or irremovable media implemented in any method or technology for storing information (such as a computer readable instruction, a data structure, a computer program module or other data). The computer-readable storage medium includes but is not limited to a random access memory (RAM), a read-only memory (ROM), an electrically erasable programmable read only memory (EEPROM), a flash memory, or other storage technologies; a compact disc read-only memory (CD-ROM), a digital versatile disc (DVD), or any other optical disc storage; magnetic cassette, magnetic tape, magnetic storage, or any other magnetic storage system; or any other medium that may be used for storing desired information and that is accessible by a computer.

In embodiments, the computer-readable storage medium may be configured to store one or more computer programs. The one or more computer programs, when executed by a processor, cause the processor to perform at least one operation of the method for transaction management in the foregoing embodiments.

Embodiments further provide a computer program (or computer software) that may be distributed in a computer-readable medium. The computer program is executable by a computer system to perform at least one operation of the method for transaction management in the foregoing embodiments.

Embodiments further provide a computer program product, including a computer-readable system that stores the computer program described in the above. In embodiments, the computer-readable system may include the computer-readable storage medium as described above.

Accordingly, a person having ordinary skill in the art shall understand that all or some of the operations, functional modules/units in the system and apparatus disclosed in the above can be implemented as software (which can be implemented by computer program codes executable by a computing system), firmware, hardware, and appropriate combinations thereof. In the hardware implementation, the division between the functional modules/units mentioned described in the above does not necessarily correspond to division of physical components. For example, a physical component may have a plurality of functions, or one function or step may be performed by several physical components. Some or all physical components can be implemented as software implemented by a processor like a central processing unit, a digital signal processor, or a microprocessor, or as hardware, or as an integrated circuit like an disclosure specific integrated circuit.

In addition, as is well known to a person having ordinary skill in the art, a communication medium usually includes a computer readable instruction, a data structure, a computer program module, or other data in a modulated data signal such as carrier waves or other transmission mechanisms, and may include any information delivery medium. Therefore, the present disclosure is not limited to any specific combination of hardware and software.

The above content is a further detailed description of the embodiments of the present disclosure in combination with specific implementations, and it cannot be determined that the specific implementation of the present disclosure is limited to the contents. For those of ordinary skill in the technical field of the present disclosure, without departing from the concept of the present disclosure, some simple deductions or substitutions can be made, which shall be regarded as belonging to the protection scope of the present disclosure.

What is claimed is:

1. A method for transaction management, comprising:
   at a coordinating node:
      receiving a structured query language (SQL) request, wherein the SQL request is forwarded by a master node;
      decomposing the SQL request into sub-SQL (SubSQL) requests; and
      transmitting each of the SubSQL requests to a corresponding slave node of slave nodes;
   at a respective slave node of the slave nodes:
      receiving and processing a corresponding SubSQL request;
      transmitting execution status information of the corresponding SubSQL request to at least one of the coordinating node and other slave nodes; and
      receiving execution status information related to processing of respective SubSQL requests by the other slave nodes; and
   at each particular slave node of at least one slave node of the slave nodes:
      feeding back a current local transaction status set of the particular slave node according to status query information received from the master node,
   the method further comprising:
      transmitting, by the at least one slave node, a global transaction status query message to one or both of the master node and the coordinating node to initiatively query a latest state of a transaction,
   wherein the method further comprises:
      before receiving, by the coordinating node, the SQL request,
      initializing a system;
      adding the master node, the coordinating node, and the slave nodes to a multicast group;
      performing statistics on transaction startup and completion in the system within a first preset time period;
         setting a value of a log TXLogMgr parameter and a value of a message TXmsgMgr parameter based on the transaction startup and completion in the system within the first preset time period;
      performing statistics on transaction startup and completion in the system within a second preset time period;
         calculating an acceleration rate of an average time spent on transaction committing in the second preset time period relative to the first preset time period; and
         adjusting the value of the log TXLogMgr parameter and the value of the message TXmsgMgr parameter based on the acceleration rate.

2. The method according to claim 1, further comprising:
   starting, by the master node, a warning timer after forwarding the SQL request to the coordinating node.

3. The method according to claim 1, wherein decomposing, by the coordinating node, the SQL request into the SubSQL requests and transmitting, by the coordinating node, each of the SubSQL requests to the corresponding slave node of the slave nodes comprises:
   decomposing for the slave nodes, by the coordinating node, the SQL request into the SubSQL requests; and
   determining, by the coordinating node, a group of network parameters for a respective slave node of the slave nodes, wherein
   the group of network parameters comprises at least one of a log TXLogMgr parameter, a message TXmsgMgr parameter, and timeout time information.

4. The method according to claim 3, wherein the group of network parameters further comprise information of the at least one slave node, the at least one slave node being determined from the slave nodes by the coordinating node to reply to the master node.

5. The method according to claim 4, further comprising:
transmitting, by the coordinating node, a respective set of network parameters to a corresponding slave node of the slave nodes through TXmsgMgr.

6. The method according to claim 1, wherein receiving and processing, by the respective slave node of the slave nodes, the corresponding SubSQL request comprises:
performing, by the respective slave node of the slave nodes, a local transaction execution operation until prepare status or abort status is reached.

7. The method according to claim 6, further comprising:
performing, by the respective slave node of the slave nodes, a rollback action in response to the abort status being reached.

8. The method according to claim 6, further comprising: in response to the prepare status being reached:
transmitting, by the respective slave node of the slave nodes, execution status information corresponding to the prepare status to the at least one of the coordinating node and the other slave nodes; and
writing, by the respective slave node of the slave nodes, the prepare status into a local storage.

9. The method according to claim 8, further comprising:
after receiving, by the respective slave node of the slave nodes, the execution status information related to processing of the respective SubSQL requests by the other slave nodes,
combining, by the respective slave node of the slave nodes, the execution status information with the received execution status information related to processing of the respective SubSQL requests by the other slave nodes;
adding, by the respective slave node of the slave nodes, the execution status information and the received execution status information that are combined to the local transaction status set; and
writing, by the respective slave node of the slave nodes, the local transaction status set into the local storage.

10. A system for transaction management, comprising a master node, a coordinating node, and slave nodes, wherein:
the coordinating node is configured to receive a structured query language (SQL) request, wherein the SQL request is forwarded by the master node;
the coordinating node is further configured to decompose the SQL request into sub-SQL (SubSQL) requests, and transmit each of the SubSQL requests to a corresponding slave node of the slave nodes;
each slave node of the slave nodes is configured to receive and process a corresponding SubSQL request, transmit execution status information of the corresponding SubSQL request to the coordinating node and/or other slave nodes, and receive execution status information related to processing of respective SubSQL requests by the other slave nodes; and
each particular slave node of at least one slave node of the slave nodes is configured to feed back a current local transaction status set of the particular slave node according to status query information received from the master node,
the at least one slave node of the slave nodes is configured to transmit a global transaction status query message to one or both of the master node and the coordinating node to initiatively query a latest state of a transaction,
wherein before the SQL request is received by the coordinating node, the system is initialized, the master node, the coordinating node, and the slave nodes are added to a multicast group; statistics are performed on transaction startup and completion in the system within a first preset time period, a value of a log TXLogMgr parameter and a value of a message TXmsgMgr parameter are set based on the transaction startup and completion in the system within the first preset time period, statistics are performed on transaction startup and completion in the system within a second preset time period, an acceleration rate of an average time spent on transaction committing in the second preset time period relative to the first preset time period is calculated, and the value of the log TXLogMgr parameter and the value of the message TXmsgMgr parameter are adjusted based on the acceleration rate.

11. A network device, comprising a processor, a memory, and a communication bus, wherein
the communication bus is configured to implement communication connection between the processor and the memory; and
the processor is configured to execute one or more computer programs stored in the memory to perform a method for transaction management;
the method comprising:
in response to the network device being a coordinating node:
receiving a structured query language (SQL) request, wherein the SQL request is forwarded by a master node;
decomposing the SQL request into sub-SQL (SubSQL) requests; and
transmitting each of the SubSQL requests to a corresponding slave node of slave nodes; and
in response to the network device being a respective slave node of the slave nodes:
receiving and processing a corresponding SubSQL request;
transmitting execution status information of the corresponding SubSQL request to at least one of the coordinating node and other slave nodes; and
receiving execution status information in processing respective SubSQL requests by the other slave nodes;
wherein each particular slave node of at least one slave node of the slave nodes feeds back a current local transaction status set of the particular slave node according to status query information received from the master node,
wherein the method further comprises:
transmitting, by the at least one slave node, a global transaction status query message to one or both of the master node and the coordinating node to initiatively query a latest state of a transaction,
wherein the method further comprises:
before receiving, by the coordinating node, the SQL request,
initializing a system;
adding the master node, the coordinating node, and the slave nodes to a multicast group;
performing statistics on transaction startup and completion in the system within a first preset time period;
setting a value of a log TXLogMgr parameter and a value of a message TXmsgMgr parameter based on the transaction startup and completion in the system within the first preset time period;
performing statistics on transaction startup and completion in the system within a second preset time period;

calculating an acceleration rate of an average time spent on transaction committing in the second preset time period relative to the first preset time period; and adjusting the value of the log TXLogMgr parameter and the value of the message TXmsgMgr parameter based on the acceleration rate.

12. A non-transitory computer-readable storage medium, storing one or more computer programs executable by one or more processors to implement a method for transaction management;

the method comprising:

by a processor at a coordinating node:

receiving a structured query language (SQL) request externally initiated, wherein the SQL request is forwarded by a master node;

decomposing the SQL request into sub-SQL (Sub-SQL) requests; and transmitting each of the SubSQL requests to a corresponding slave node of slave nodes;

by a processor at a respective slave node of the slave nodes:

receiving and processing a corresponding SubSQL request;

transmitting execution status information of the corresponding SubSQL request to at least one of the coordinating node and other slave nodes; and receiving execution status information in processing respective SubSQL requests by the other slave nodes; and by a processor at each particular slave node of at least one slave node of the slave nodes:

feeding back a current local transaction status set of the particular slave node according to status query information received from the master node, wherein the method further comprises:

transmitting, by the at least one slave node, a global transaction status query message to one or both of the master node and the coordinating node to initiatively query a latest state of a transaction, wherein the method further comprises:

before receiving, by the coordinating node, the SQL request, initializing a system;

adding the master node, the coordinating node, and the slave nodes to a multicast group;

performing statistics on transaction startup and completion in the system within a first preset time period;

setting a value of a log TXLogMgr parameter and a value of a message TXmsgMgr parameter based on the transaction startup and completion in the system within the first preset time period;

performing statistics on transaction startup and completion in the system within a second preset time period;

calculating an acceleration rate of an average time spent on transaction committing in the second preset time period relative to the first preset time period; and adjusting the value of the log TXLogMgr parameter and the value of the message TXmsgMgr parameter based on the acceleration rate.

13. The network device according to claim 11, wherein in response to the network device being the master node, the method further comprises:

starting a warning timer after forwarding the SQL request to the coordinating node.

14. The network device according to claim 11, wherein decomposing the SQL request into the SubSQL requests and transmitting each of the SubSQL requests to the corresponding slave node of the slave nodes comprises:

decomposing for the slave nodes the SQL request into the SubSQL requests; and determining a group of network parameters for a respective slave node of the slave nodes, wherein the group of network parameters comprises at least one of a log TXLogMgr parameter, a message TXmsgMgr parameter, and timeout time information.

15. The network device according to claim 14, wherein the group of network parameters further comprise information of the at least one slave node, the at least one slave node being determined from the slave nodes by the coordinating node to reply to the master node.

16. The network device according to claim 15, wherein in response to the network device being the coordinating node, the method further comprises:

transmitting a respective set of network parameters to a corresponding slave node of the slave nodes through TXmsgMgr.

17. The network device according to claim 11, wherein receiving and processing the corresponding SubSQL request comprises:

performing a local transaction execution operation until prepare status or abort status is reached.

18. The method according to claim 1, wherein the initializing a system comprises:

initializing an action value table, with the action value table recording an evaluation score of an action under a status, the setting a value of a log TXLogMgr parameter and a value of a message TXmsgMgr parameter based on the transaction startup and completion in the system within the first preset time period comprises:

determining an initialization status based on the transaction startup and completion in the system within the first preset time period;

selecting an action corresponding to a highest evaluation score under the initialization status based on the action value table; and executing the action corresponding to the highest evaluation score under the initialization status, to set the value of the log TXLogMgr parameter and the value of the message TXmsgMgr parameter.

19. The method according to claim 18, wherein the adjusting the value of the log TXLogMgr parameter and the value of the message TXmsgMgr parameter based on the acceleration rate comprises:

updating the action value table based on the acceleration rate;

determining a current status based on the transaction startup and completion in the system within the second preset time period;

selecting an action corresponding to a highest evaluation score under the current status based on the action value table updated;

executing the action corresponding to the highest evaluation score under the current status, to adjust the value of the log TXLogMgr parameter and the value of the message TXmsgMgr parameter.

* * * * *

UNITED STATES PATENT AND TRADEMARK OFFICE
CERTIFICATE OF CORRECTION

PATENT NO. : 12,386,819 B2
APPLICATION NO. : 17/767432
DATED : August 12, 2025
INVENTOR(S) : Tao Wen et al.

Page 1 of 1

It is certified that error appears in the above-identified patent and that said Letters Patent is hereby corrected as shown below:

In the Specification

Column 7, Line 54, the formula reading - $i=p*|F|\pm f$ - should read -- $i=p*|F|+f$ --

Signed and Sealed this
Twenty-third Day of December, 2025

John A. Squires
*Director of the United States Patent and Trademark Office*